H. G. MYERS.
SUSPENSION FOR AXLE LIGHTING DYNAMOS.
APPLICATION FILED OCT. 1, 1913.

1,142,267. Patented June 8, 1915.
2 SHEETS—SHEET 1.

WITNESSES:
Lester Woodbridge
Joseph H. Tracy

INVENTOR
Herbert G. Myers
BY
Augustus B. Stoughton.
ATTORNEY.

H. G. MYERS.
SUSPENSION FOR AXLE LIGHTING DYNAMOS.
APPLICATION FILED OCT. 1, 1913.

1,142,267.

Patented June 8, 1915.
2 SHEETS—SHEET 2.

WITNESSES:
J. Lester Woodbridge
Joseph H. Tracy

INVENTOR
Herbert G. Myers
BY
Augustus B. Stoughton.
ATTORNEY.

UNITED STATES PATENT OFFICE.

HERBERT G. MYERS, OF CHICAGO, ILLINOIS, ASSIGNOR TO THE ELECTRIC STORAGE BATTERY COMPANY, OF PHILADELPHIA, PENNSYLVANIA, A CORPORATION OF NEW JERSEY.

SUSPENSION FOR AXLE-LIGHTING DYNAMOS.

1,142,267.          Specification of Letters Patent.      Patented June 8, 1915.

Application filed October 1, 1913. Serial No. 792,744.

*To all whom it may concern:*

Be it known that I, HERBERT G. MYERS, a citizen of the United States, and a resident of Chicago, in the county of Cook and State of Illinois, have invented certain new and useful Improvements in Suspensions for Axle-Lighting Dynamos, of which the following is a specification.

My invention relates to apparatus for the electric lighting of trains comprising a dynamo suspended from the truck and driven by a belt or other gear from the axle, and the object of my invention is to provide more simple and durable and less expensive means for suspending the dynamo from the truck frame.

Figure 1:
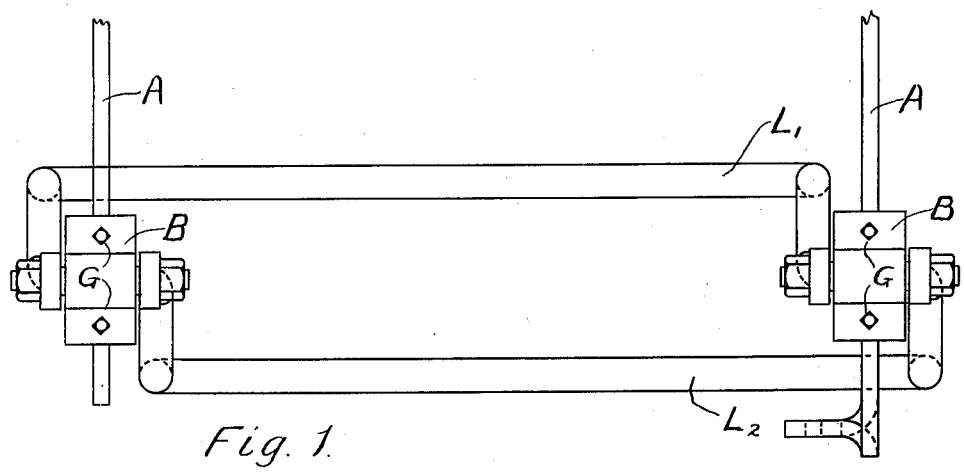
Figure 2:
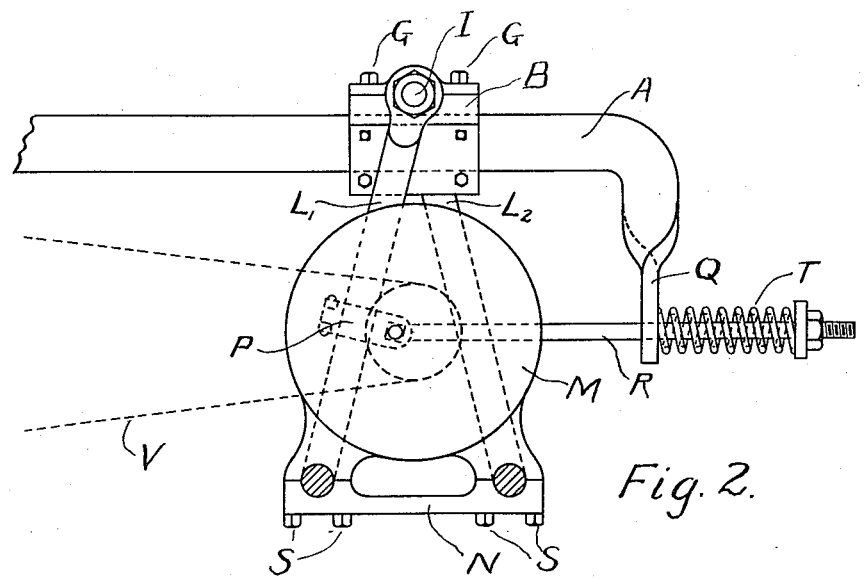
Figure 3:
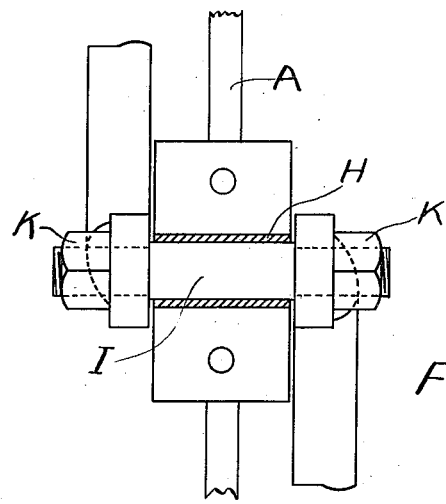
Figure 4:
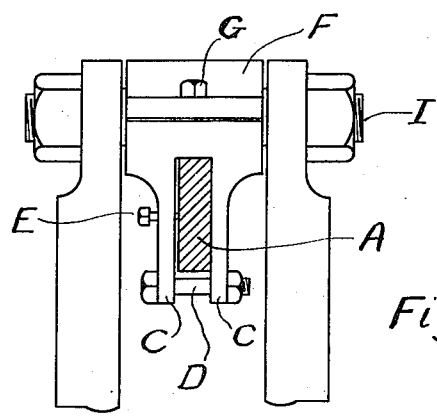

In the drawings, Figure 1 is a top view of a dynamo suspension constructed in accordance with my invention, the dynamo being omitted for clearness; Fig. 2 is a side view of the same partly in section showing the dynamo in position; Fig. 3 is a top view of the bearing saddle partly in section and Fig. 4 is a front view of the bearing saddle.

In the drawings A A are side bars which may be supported from the truck frame in any suitable manner. Upon these bars are carried the bearing saddles B B. As shown in Fig. 4 the bearing saddle consists of two parts, the lower part riding on the side bar A, the parts C C extending below the bar and provided with through bolts D, for clamping the saddle to the bar at any desired point. A set screw E is also provided to prevent the saddle from moving along the bar. The upper part of the saddle F is a bearing cap which is fastened to the lower part by the cap screws G. The bearing is provided with a suitable bushing shown in section at H in Fig. 3, this figure being a top view of the bearing saddle with the cap removed. The bushing is preferably designed to be clamped tightly in the bearing by the cap so that it will not turn. A pin I is carried by the bearing fitted loosely into the bushing so that it can turn as the dynamo swings in either direction from its mean position. The two loop bars L¹ and L² are supported from the pins I. Each end of each loop bar is finished with an eye which fits over the end of the pin I and is clamped up against a shoulder of said pin, being held firmly in position by the nut K, thus the loop bars cannot turn on the pins but each pin must turn with the bars as the dynamo swings. It will be seen from the above that the only wearing surfaces are those between the pins I and the bushings H. If desired the pins may be made of harder material than the bushings so that the latter will be subjected to the greater amount of wear. The bushings are preferably made of standard steel tubing, cut to proper length so that these bushings are easily and inexpensively replaced when they become worn.

As shown on the drawings the two loop bars are interchangeable. This is accomplished by fastening both ends of one bar to the right-hand end of each pin, and both ends of the other bar to the left-hand end of each pin.

As shown in Fig. 2 the dynamo M is provided with suitable feet which are clamped to the horizontal portions of the two loop bars by means of the clamp bar N and the cap screws S. In Fig. 2 is also shown the usual tension rod R fastened to the rear loop bar L¹ by means of the clamp P and supported by the turned down end Q of the right-hand side bar, an adjustable tension spring T being provided to keep the proper tension on the belt V.

Having described my invention what I claim and desire to secure by Letters Patent is—

1. Means for suspending a dynamo from a vehicle truck comprising side bars, a bearing saddle on each of said side bars having a bearing transverse to said bar, a pin movable in said bearing and projecting on either side thereof, and two loop bars for supporting the dynamo from below whereof the right hand ends are rigidly clamped to opposite ends respectively of one of said pins and the left hand ends to opposite ends respectively of the other pin, substantially as described.

2. Means for suspending a dynamo from a vehicle truck comprising side bars, a bearing saddle on each of said bars having a bearing transverse to said bar comprising a tubular bushing and means for clamping said bushing in a fixed position, a pin movable in said bushing and projecting on either side thereof, and two loop bars for supporting the dynamo from below whereof the right hand ends are rigidly clamped to opposite ends respectively of one of said pins and the left hand ends to opposite ends respectively of the other pin, substantially as described.

3. Means for suspending a dynamo from a vehicle truck comprising side bars, a bearing saddle on each of said side bars having a bearing transverse to said bar, a pin movable in said bearing and projecting on either side thereof, and two loop bars for supporting the dynamo from below whereof the opposite ends of one are supported by the right hand ends of the two pins respectively, and the opposite ends of the other are supported by the left hand ends of said pins respectively, substantially as described.

4. Means for suspending a dynamo from a vehicle truck comprising side bars, a bearing saddle on each of said side bars having a bearing transverse to said bar, a pin movable in said bearing and projecting on either side thereof, and two interchangeable loop bars for supporting the dynamo from below whereof the opposite ends of one are supported by the right hand ends of the two pins respectively, and the opposite ends of the other are supported by the left hand ends of said pins respectively, substantially as described.

5. The combination of a dynamo, side bars, a pair of pins supported by and turnable in respect to the side bars and a frame rigid with each end of each pin and with the dynamo.

6. The combination of a dynamo, side bars, a pair of pins on top of the side bars and turnable in respect thereto and a frame rigid with each end of each pin and with the dynamo.

7. Means for suspending a dynamo from a vehicle comprising the combination of a pair of supports spaced apart, a pair of interchangeable loop bars having their corresponding ends disposed on opposite sides of the respective supports, and pivotally supported thereby, and a dynamo rigidly connected with the loop bars, substantially as described.

In testimony whereof I have hereunto signed my name.

HERBERT G. MYERS.

Witnesses:
S. W. EVERETT,
J. WHITTIER BUFFUM.